(12) United States Patent
Walz (10) Patent No.: US 7,578,633 B2
(45) Date of Patent: Aug. 25, 2009

(54) CONNECTOR FOR PLATES, PARTICULARLY FOR SHELVES OR TRAYS

(75) Inventor: Rüdiger Walz, Haigerloch (DE)

(73) Assignee: Häfele GmbH & Co. KG, Nagold (DE)

( * ) Notice: Subject to any disclaimer, the term of this patent is extended or adjusted under 35 U.S.C. 154(b) by 141 days.

(21) Appl. No.: 11/342,190

(22) Filed: Jan. 27, 2006

(65) Prior Publication Data

US 2006/0171777 A1 Aug. 3, 2006

(30) Foreign Application Priority Data

Jan. 29, 2005 (DE) .................. 20 2005 001 451 U (51) Int. Cl.
*B25G 3/00* (2006.01)
*F16B 2/02* (2006.01)
*F16B 7/04* (2006.01)

(52) U.S. Cl. ................. 403/350; 403/381; 403/DIG. 8; 108/153.1; 312/111

(58) Field of Classification Search ................. 403/231, 403/382, 381, 403, 350–353, DIG. 8, DIG. 10–DIG. 13; 248/188, 188.1; 108/158.12, 153.1; 312/118, 312/111, 265.2, 259
See application file for complete search history.

(56) References Cited

U.S. PATENT DOCUMENTS

| 4,047,822 | A | * | 9/1977 | Lehmann ..................... 403/187 |
| 4,397,064 | A | * | 8/1983 | Lautenschlager et al. ..... 16/379 |
| 4,458,965 | A | * | 7/1984 | Ohlendorf et al. ........ 312/265.1 |
| 4,549,831 | A | * | 10/1985 | Lautenschlager, Jr. ...... 403/231 |
| 4,639,161 | A | * | 1/1987 | Mazaki ........................ 403/245 |
| 4,883,382 | A | * | 11/1989 | Mushya ....................... 411/182 |
| 4,930,931 | A | * | 6/1990 | Matsui ........................ 403/231 |
| 5,403,109 | A | * | 4/1995 | Johnson et al. ............. 403/231 |
| 5,567,081 | A | * | 10/1996 | Vallance ..................... 403/292 |
| 5,718,493 | A | * | 2/1998 | Nikolai ....................... 312/245 |
| 5,772,353 | A | * | 6/1998 | Grieser et al. ............... 403/231 |
| 5,785,451 | A | * | 7/1998 | Horger et al. ............ 403/408.1 |
| 5,788,395 | A | * | 8/1998 | Grieser et al. ............... 403/231 |
| 5,833,416 | A | * | 11/1998 | Cau ............................. 411/55 |
| 6,908,252 | B1 | * | 6/2005 | Rubano ....................... 403/231 |
| 6,939,075 | B2 | * | 9/2005 | Walz ........................... 403/231 |
| 6,997,496 | B2 | * | 2/2006 | Danev ......................... 296/29 |

FOREIGN PATENT DOCUMENTS

| DE | 26 10 200 | | 9/1977 |
| DE | 202004012350 U1 | * | 11/2004 |
| EP | 1 008 767 | | 6/2000 |
| WO | 2005/059374 | | 6/2005 |

* cited by examiner

*Primary Examiner*—Daniel P Stodola
*Assistant Examiner*—Nahid Amiri
(74) *Attorney, Agent, or Firm*—Friedrich Kueffner

(57) ABSTRACT

A connector for plates, particularly for shelves or trays, includes a mounting member which is insertable into a recess of a first part, wherein a fastening member for a second part is insertable into the mounting member approximately in axial direction. A bolt or the like which is rotatable between a release position and a locking position is mounted in the mounting member, wherein a support member is provided between the bolt and the wall of the mounting member on the circumference of the bolt, and wherein the bolt and/or the support member have for pressing against each other a particularly arc-shaped thickened portion or at least a partially eccentric configuration.

12 Claims, 9 Drawing Sheets

CONNECTOR FOR PLATES, PARTICULARLY FOR SHELVES OR TRAYS

BACKGROUND OF THE INVENTION

1. Field of the Invention

The present invention relates to a connector for plates, particularly for shelves or trays. The connector includes a mounting member which is insertable into a recess of a first part, wherein a fastening member for a second part is insertable into the mounting member approximately in axial direction.

2. Description of the Related Art

In a known embodiment of this type, a locking disk is rotatably mounted in the mounting member, wherein the locking member engages in a groove of the fastening member. In this embodiment, the support surface of the groove and the contact surface of the locking disk have oppositely directed inclinations, so that the fastening member is axially pressed against the mounting member.

In another, connector or fitting, the fastening member includes a bolt with a recess, wherein a locking member rotatably arranged in the mounting member engages in the recess of the bolt. While this produces the result that the connector is tensioned vertically as well as horizontally, the bolt is clamped transversely of its direction of insertion, so that shearing forces act on the bolt.

SUMMARY OF THE INVENTION

It is the primary object of the present invention to provide a connector of the above-described type in which parts of the connecting fitting, and, thus, of the plates or the like, are pressed together in the longitudinal direction as well as in the transverse direction of the connector fitting, without having any shearing forces act on the connector.

In accordance with the present invention, a bolt or the like which is rotatable between a release position and a locking position is mounted in the mounting member, wherein a support member is provided between the bolt and the wall of the mounting member on the circumference of the bolt, and wherein the bolt and/or the support member have for pressing against each other a particularly arc-shaped thickened portion or at least a partially eccentric configuration.

A particularly favorable construction of the support member is achieved if it is constructed as an arc-shaped wall member which partially surrounds the bolt and is approximately axially directed. The bolt preferably has a flange which rests against the lower edge of the support member, so that the axial position of the bolt is ensured. Also provided for locking the bolt is a pin arranged on the fastening member, wherein the pin extends up to the bolt to approximately a location transversely of the longitudinal axis thereof. This pin is advantageously located below the flange of the bolt.

In accordance with a preferred embodiment, the mounting member is approximately tubular and at least partially slotted in the axial direction.

The mounting member additionally has at the edges of its slot obliquely downwardly inclined dove-tail shaped guide grooves for cylinder fastening member.

Provided in the mounting member for supporting the bolt is a transverse bottom which for reasons of stability is additionally reinforced by an axially extending transverse wall. The bolt itself has at its lower end a guide pin, a locking disk and the bottom has a corresponding recess, wherein the locking disk engages under the bottom at least in the locking position of the bolt.

The mounting member is preferably provided for resting on a plate to be fastened with one or more laterally protruding plate-shaped rings with recesses for screws or the like. The fastening member is constructed as a cover plate which protrudes beyond the mounting member and has a perpendicularly extending leg which is insertable into the grooves of the mounting member, wherein the leg supports a pin which is directed approximately transversely of the longitudinal axis of the leg. Due to the plate-shaped configuration, the screws which serve for fastening the mounting member can be covered. Provided in the leg of the mounting member is at least one recess, particularly two recesses, for fastening screws or the like. The cover plate additionally has an opening toward the bolt and the bolt has at its end opposite the bearing pin one or more slots for the engagement of a tool.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
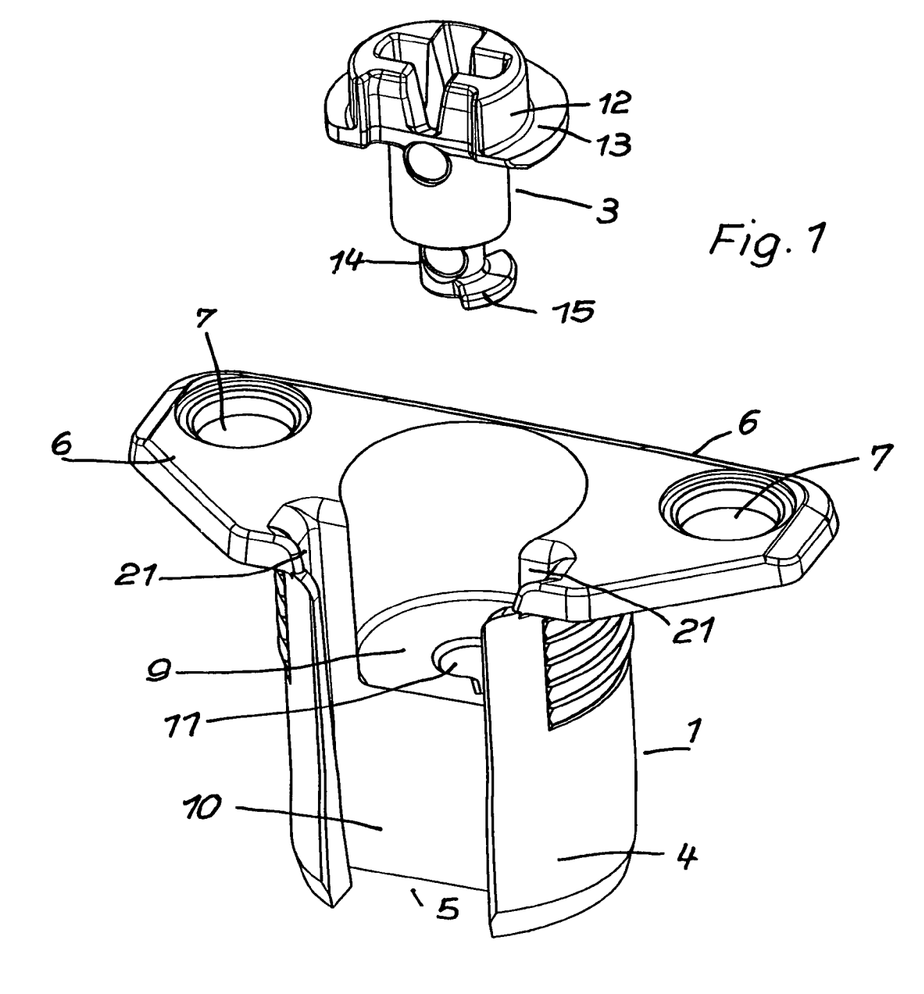
FIG. 1 is a perspective exploded view of the mounting member of the connector of the present invention with a bolt prior to insertion.
Figure 2:
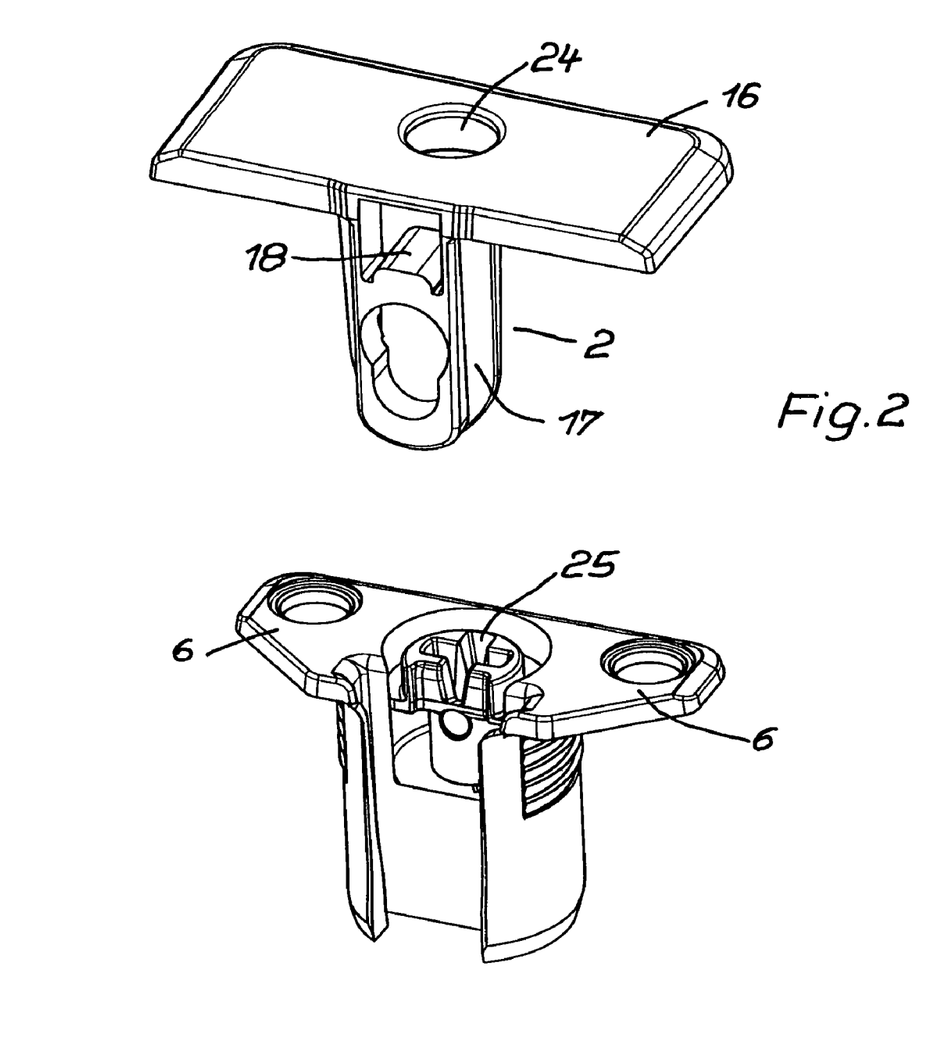
FIG. 2 is a perspective view of the mounting member with inserted bolt and with fastening member prior to insertion.
Figure 3:
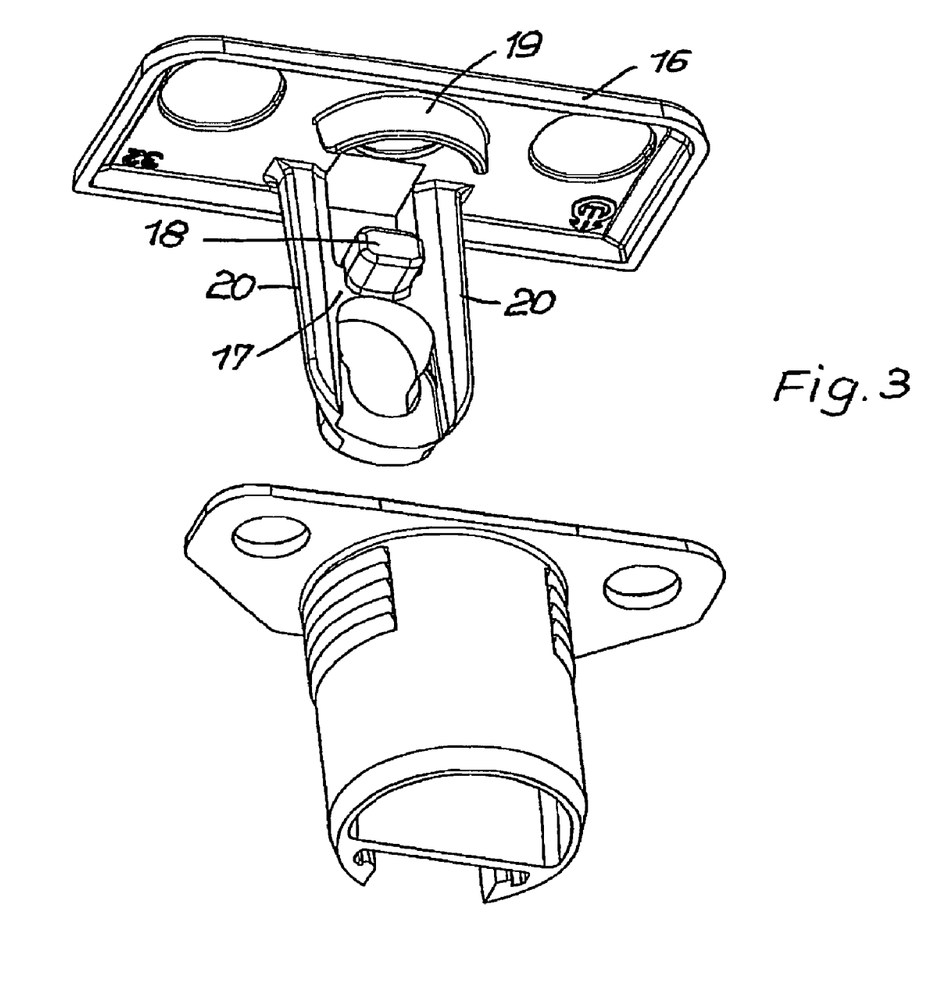
FIG. 3 is a rear view of the connector shown in FIG. 2.

As illustrated in FIGS. 1 and 2, the connector is composed of three parts, namely, the mounting member 1, the fastening member 2 and bolt 3.

Figure 9:
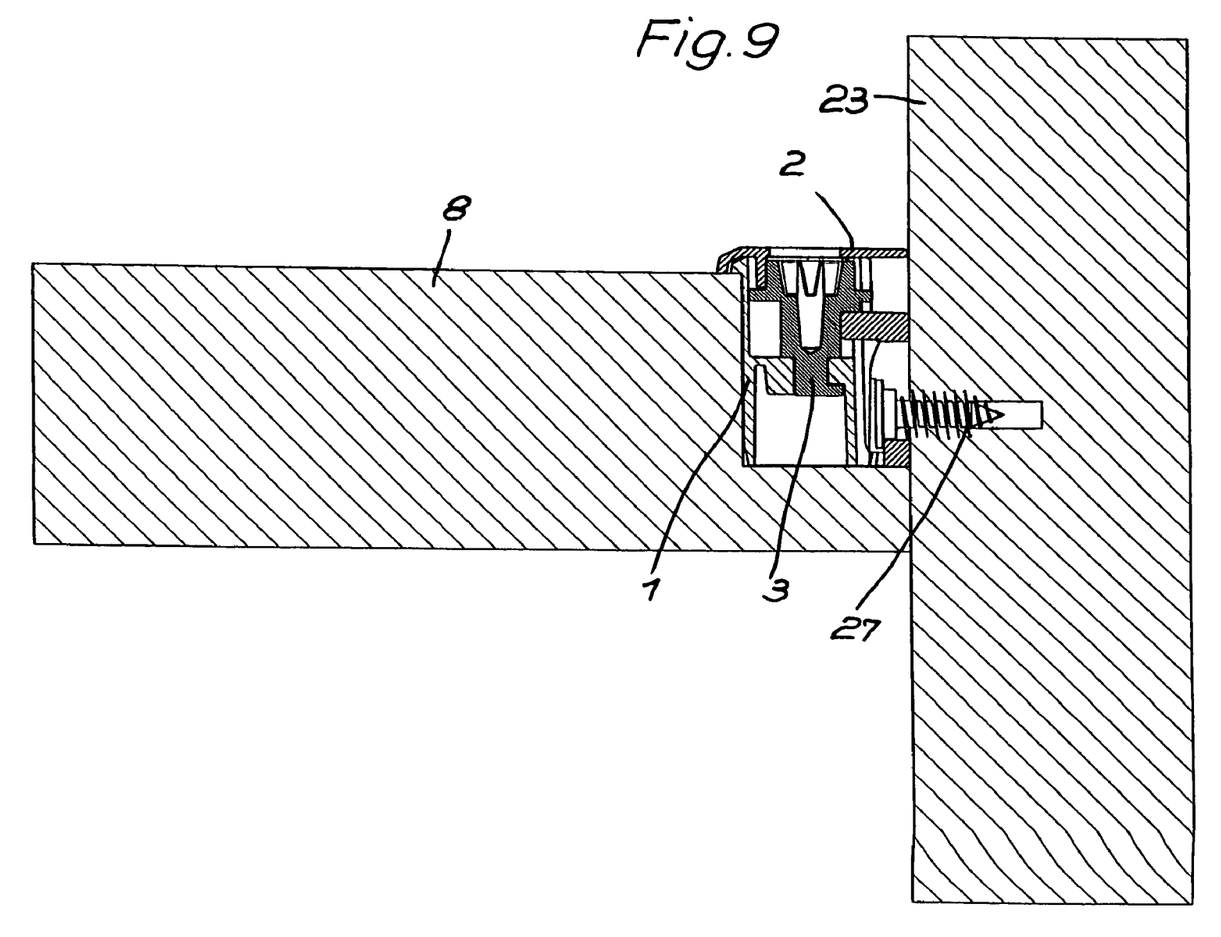
FIG. 9 is a sectional view of two plates connected by means of the connector of the present invention.

The mounting member 1 is composed of a tubular base body 4 which has a longitudinal slot 5 which extends in the axial direction. Particularly for the connection for honeycomb-type plates, at the upper end of the tubular base body 4 are provided two laterally protruding plates 6 with recesses 7 for fastening screws, not shown. In the mounted state, mounting member rests on the surface of a plate 8 with these rings and is connected by means of fastening screws, as illustrated in FIG. 9. A transverse bottom 9 is arranged approximately in the middle of the tubular base body 4, wherein the transverse bottom 9 is additionally supported by an axially extending transverse wall 10. The transverse bottom 9 has a recess 11 for the bolt 3.

Figure 4:
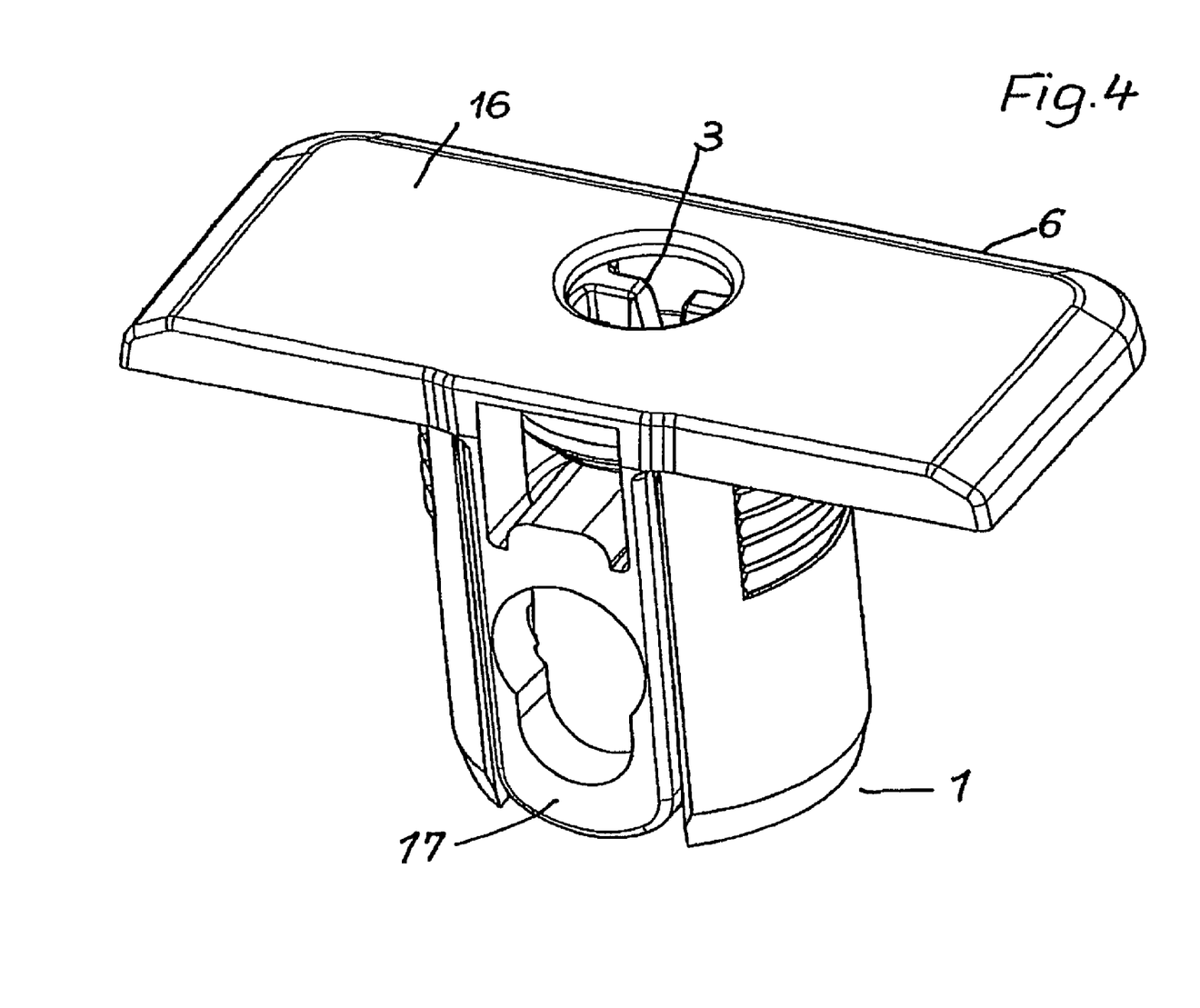
FIG. 4 is a perspective view of the assembled connector.
Figure 5:
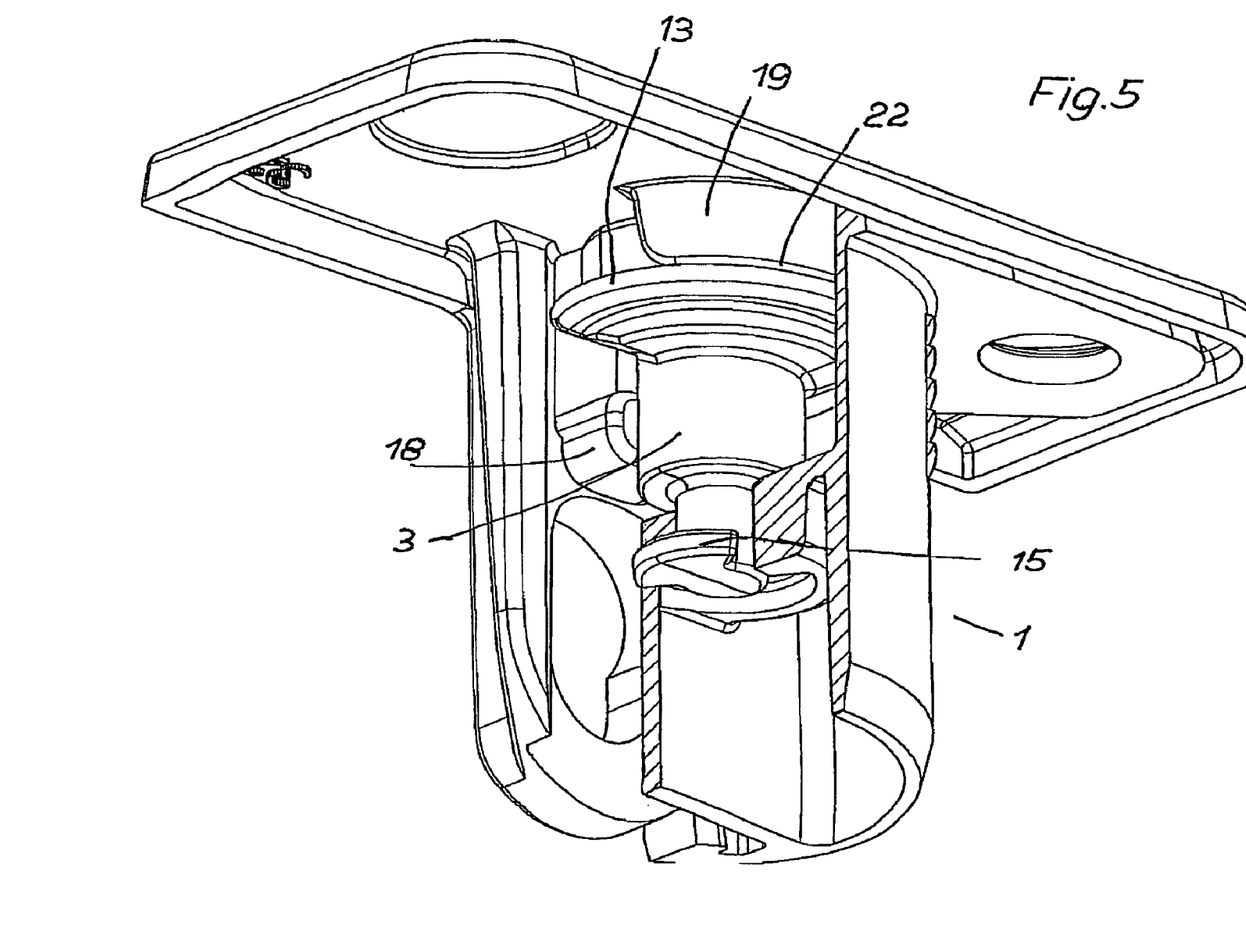
FIG. 5 is a perspective rear view of the connector, partially in section and on a larger scale, of the mounting member with inserted bolt and fastening member in the released position of the bolt.
Figure 6:
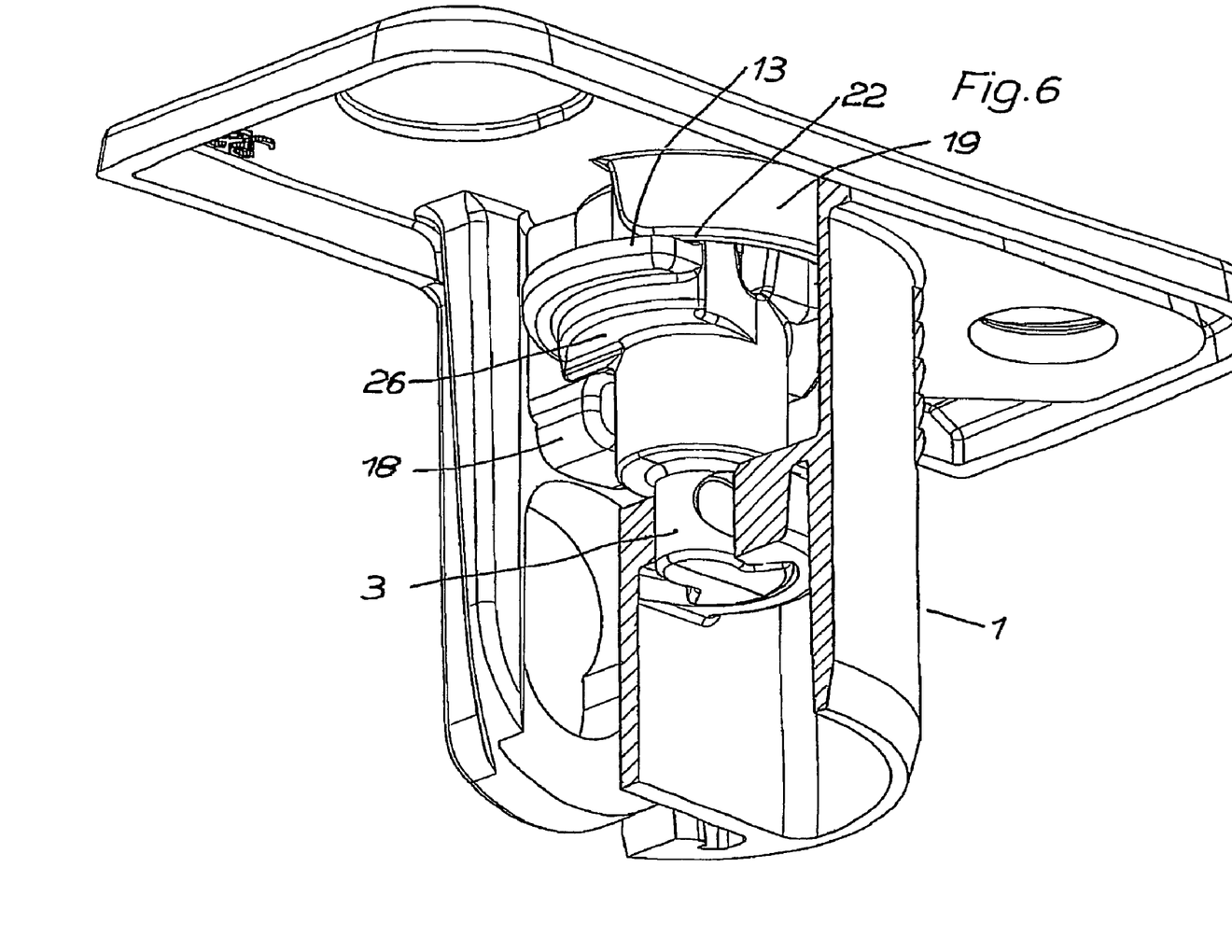
FIG. 6 is an illustration of the connector of FIG. 5 shown in the locking position of the bolt.

The bolt 3 can be rotatably mounted in the tubular base body 4 of the mounting member 1 on the transverse bottom 9. Located below the bolt head 12 is a unilaterally cut flange 13 with a slight inclination opposite the direction of rotation into the locking position. A bearing pin 14 is provided at the lower end, wherein the bearing pin 14 engages in the recess 11 of the transverse bottom 9 and engages under the transverse bottom line with a locking disk 15 at least in the locked position of the connector. The recess 11 is shaped in such a way that the bolt 3 can be inserted at least in the released position according to FIG. 4 together with the bearing pin 14 and the locking disk 15 into the recess 11 of the bottom part 9. Upon a rotation into the locking position according to FIG. 5, the locking disk 15 engages under the transverse bottom 9, so that the bolt 3 is held in its axial position. In addition, as seen in FIG. 6, the bolt 3 has underneath its flange 13 a stop 26 whose operation shall be explained further below.

The fastening member 2 is composed of a plate 16 which after being mounted in the mounting member, with its wings 6 covers the mounting member 1 and a leg 17 extending perpendicularly of the plate 16. Arranged on the leg 17 is an inwardly directed pin 18 extending transversely of the axial direction for contacting the bolt 3 and, thus, for locking the bolt 3. The plate 16 has opposite the leg 17 an arc-shaped wall portion 19 which protrudes downwardly from the plate 16 and partially surrounds the bolt head 12. Moreover, the leg 17 is provided at its rear edge with two guide rails 20 which engage in two obliquely downwardly and inwardly directed dovetail-shaped guide bolts 12 provided at the edges of the longitudinal slot 5 of the mounting member 1. The mounting member 1 can only be inserted as long as the bolt 3 is in the released position according to FIG. 4.

When the bolt 3 is rotated in the clockwise direction, the eccentrically-shaped bolt head 12 presses against the wall part 19 which acts as a contact pressure member, so that the fastening member 2 is pressed against the mounting member 1. The fastening member 2 is simultaneously pressed against the mounting member 1 in the axial direction by means of the inclined flange 13 which rests against the lower edge 22 of the wall part 19. This results in a firm connection of the parts to each other in the vertical as well as in the horizontal direction, wherein this connection is also transmitted to the plates 8, 23 which are connected, as seen in FIG. 9. In order to prevent a further rotation beyond the locked position, the stop 26 rests in this position against the pin 18, as seen in FIG. 6. The parts can also be once again separated from each other without problems by rotating the bolt 3 back from the locked position according to FIG. 5 into the released position according to FIG. 4.

In order to facilitate an easy adjustment of the bolt 3, a cutout 24 which exposes the bolt 3 is provided in the cover plate 16 and one or more slots 25 for the engagement of a tool are provided in the bolt 3.

Figure 7:
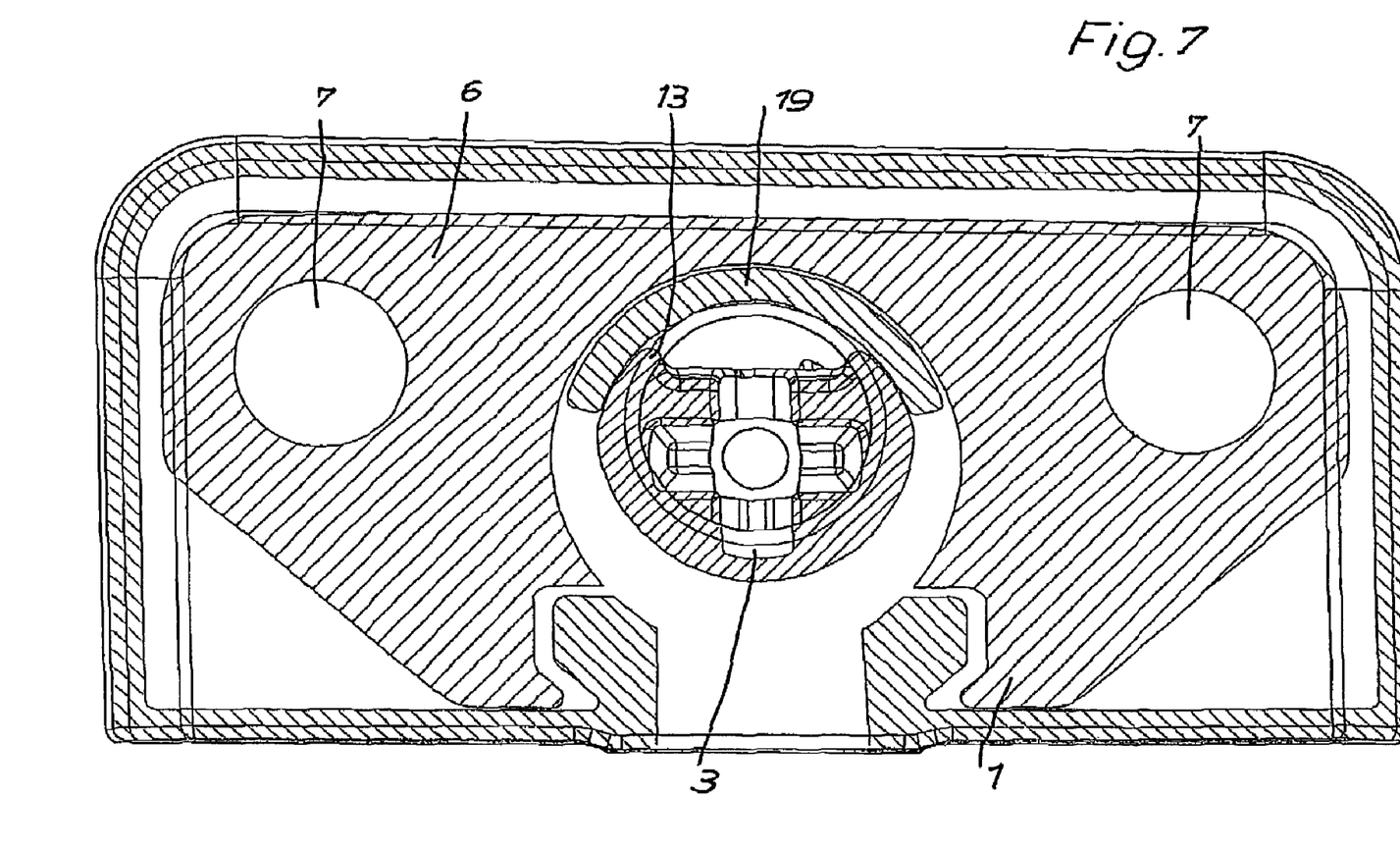
FIG. 7 is a sectional view of the connector of FIG. 5.
Figure 8:
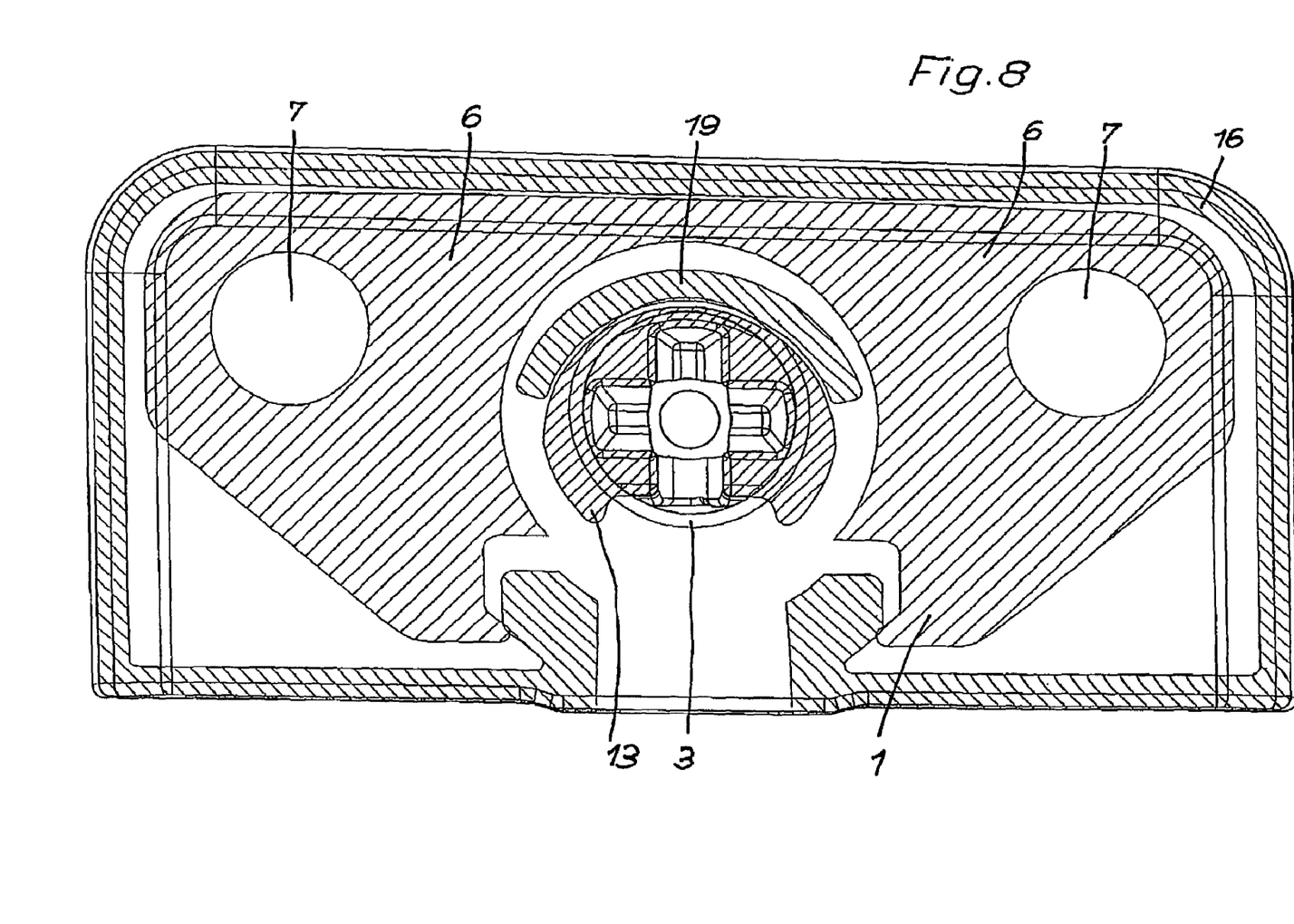
FIG. 8 is a sectional view of the connector of FIG. 6.

FIGS. 7 and 8 show in sectional views the respective positions of the mounting member 1 and the fastening member 2 relative to each other in the two end positions of the bolt 3. FIG. 7 shows the release position and FIG. 8 shows the locked position. FIG. 9 shows the use of the connector for shelves or trays, wherein the connector 1 is arranged in a recess of the plate 8 and the fastening member 2 is fastened by means of a screw 27 to the second plate 23.

While specific embodiments of the invention have been shown and described in detail to illustrate the inventive principles, it will be understood that the invention may be embodied otherwise without departing from such principles.

I claim:

1. A connector for plates, the connector comprising a mounting member insertable into a recess of a first part, a fastening member connected to a second part, the fastening member comprising a leg, a coverplate having an arcuate support member with a partially eccentric configuration and being insertable approximately in an axial direction into the mounting member, further comprising a bolt which is rotatable between a released position and a locked position, the support member being arranged on a circumference of the bolt between the bolt and a wall of the mounting member, and wherein the fastening member is inserted into the mounting member, wherein at least part of the bolt and the support member have a mutual contact pressure, wherein the bolt has a flange resting against a lower edge of the support member, wherein the flange has an inclination against the direction of rotation of the bolt into the locking position.

2. The connector according to claim 1, wherein the support member is an arc-shaped wall portion which is approximately axially directed and partially surrounds the bolt.

3. The connector according to claim 1, wherein the mounting member is approximately tubular and has at least one partial slot extending in the axial direction.

4. The connector according to claim 3, wherein the mounting member has at edges of the slot inclined dovetail-shaped guide grooves which extend downwardly and inwardly for receiving the fastening member.

5. The connector according to claim 1, wherein the bolt has at a lower end thereof a bearing pin with locking disk and the transverse bottom has a corresponding recess, wherein the locking disk engages under the transverse bottom at least in the locking position of the bolt, wherein the mounting member has a transverse bottom for supporting the bolt.

6. The connector according to claim 5, wherein the transverse bottom is supported by an axially extending transverse wall.

7. The connector according to claim 5, wherein the cover plate protrudes beyond the mounting member, the cover plate having a leg extending perpendicularly of the cover plate and insertable into the guide grooves of the mounting member, wherein the leg has the pin which extends approximately transversely of a longitudinal direction thereof.

8. The connector according to claim 7, wherein the cover plate has an opening and the bolt has at an end opposite the pin one or more slots for an engagement of a tool.

9. The Connector according to claim 1, wherein the mounting member has at least on laterally protruding plate-shaped wing with recess for a screw which rests on one of the plates to be fastened.

10. A connector for plates, the connector comprising a mounting member insertable into a recess of a first part, a fastening member connected to a second part, the fastening member comprising a leg, a cover plate having an arcuate support member with a partially eccentric configuration and being insertable approximately in an axial direction into the mounting member, further comprising a bolt which is rotatable between a released position and a locked position, the support member being arranged on a circumference of the bolt between the bolt and a wall of the mounting member, and wherein the fastening member is inserted into the mounting member, wherein at least part of the bolt and the support member have for a mutual contact pressure, wherein the bolt has a flange resting against a lower edge of the support member, wherein the fastening member has a pin extending in the mounting member to the bolt approximately transversely of a longitudinal axis thereof.

11. The connector according to claim 10, wherein the bolt has a stop interacting with the pin for limiting the direction of rotation of the bolt past the locking position thereof.

12. The connector according to claim 10, wherein the pin is located underneath the flange of the bolt.

* * * * *